July 23, 1957

J. CLAPP 2,800,335

COLLAPSIBLE WHEELBARROW

Filed July 21, 1955

Jack Clapp
INVENTOR.

By Loyal J. Miller
ATTORNEY

July 23, 1957  J. CLAPP  2,800,335
COLLAPSIBLE WHEELBARROW

Filed July 21, 1955  3 Sheets-Sheet 2

Jack Clapp,
INVENTOR.

BY Loyal J. Miller
ATTORNEY

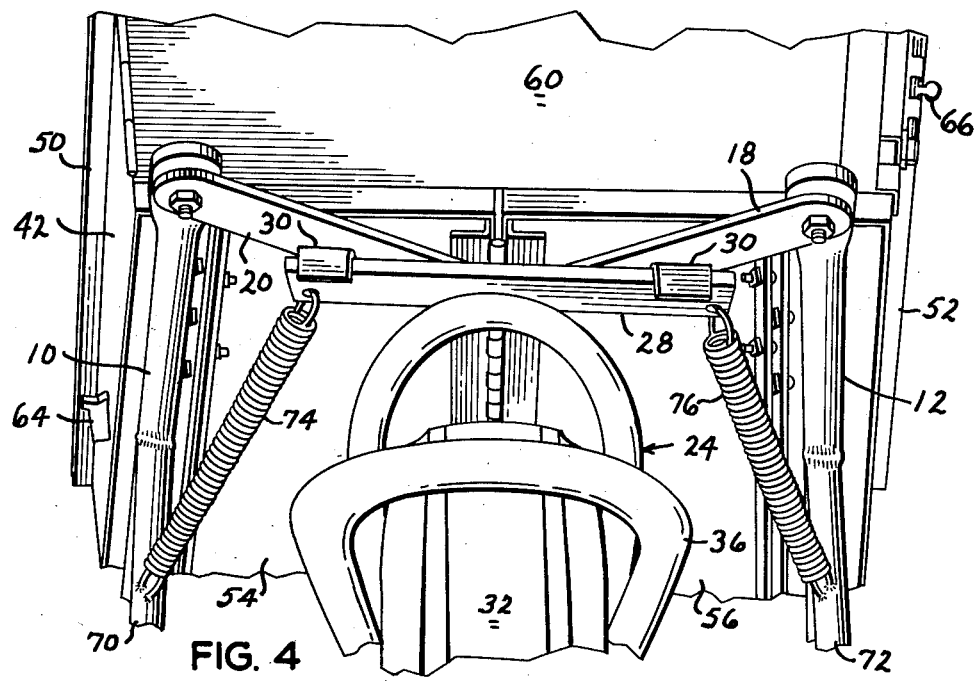
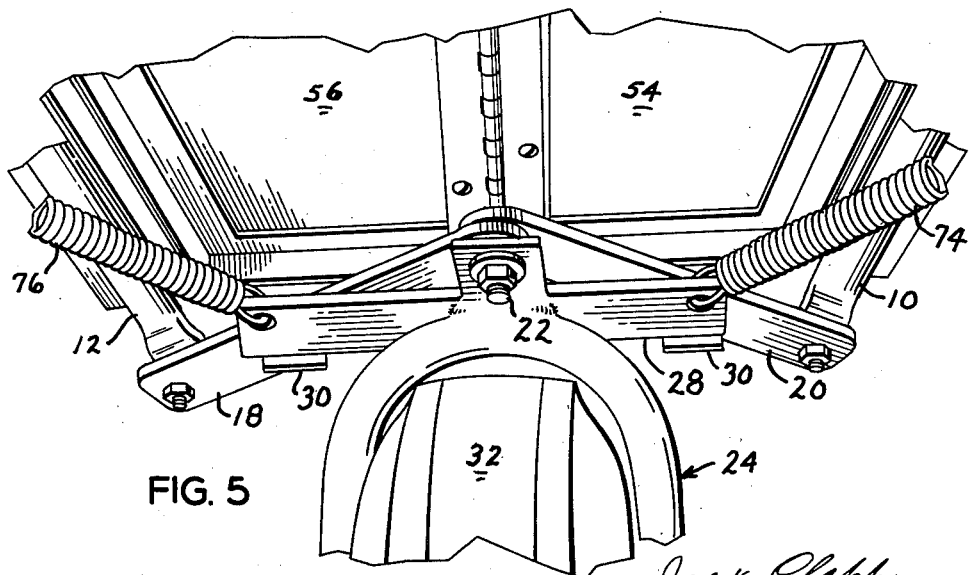

United States Patent Office 2,800,335
Patented July 23, 1957

2,800,335

COLLAPSIBLE WHEELBARROW

Jack Clapp, Oklahoma City, Okla.

Application July 21, 1955, Serial No. 523,541

5 Claims. (Cl. 280—42)

The present invention relates to gardening tools, and more particularly to a folding or collapsible wheelbarrow as used in gardening work.

Many home owners who do their own gardening work find they need a wheelbarrow for transporting soil, trash, etc.; but are hindered in keeping one on the premises by the small amount of storage space available in the average garage or utility room. A conventional wheelbarrow is necessarily bulky and not easily stored in an out-of-the-way place during the long periods of time when the same is not in use.

It is therefore the principal object of this invention to provide a wheelbarrow which may be folded or collapsed into a comparatively small space for storing when not in use, and be hung on the wall of the garage or outbuilding.

Another object of this invention is to provide a collapsible wheelbarrow which is sturdily constructed and may be used in a conventional manner.

Another object of this invention is to provide a collapsible wheelbarrow in which all the component parts thereof remain connected together when in folded or collapsed position and therefore precludes any of the same being inadvertently lost or misplaced.

An additional object is to provide a wheelbarrow of this class which may be manually collapsed or erected by a novice without the use of tools or special equipment.

A further object is to provide a collapsible wheelbarrow in which the chassis and tray thereof both fold into a space substantially equal in width to the length of the axle on which the single wheel is journaled.

Yet another object is to provide a wheelbarrow of this class which may be positively latched or fastened in operating position and which can not be accidently tripped for collapsing while in use.

The present invention accomplishes these and other objects by providing a pair of shafts or side members connected in spaced forwardly converging relation by transverse cross members. The forward cross member is pivotally connected adjacent each of its ends to the forward end of each shaft, respectively, and is hingedly connected for horizontal movement medially its ends. Similarly a second cross member is connected intermediate the ends of the side members. An inverted U-shaped yoke depends from the hinged connection of the forward cross member and rotatably journals the single wheel between its depending ends. A transverse cross bar carried by the yoke maintains the wheel in longitudinal alignment with the shafts by contacting lugs depending from the forward cross member. A folding tray or receptacle having substantially vertical opposing side wall panels is carried by each respective side member and extends longitudinally between the cross members. A planar bottom is hingedly connected adjacent each longitudinal edge to each vertical side, respectively. The bottom is further longitudinally hingedly connected medially its side edges. Forwardly, the tray is closed by an end panel hingedly connected to the opposing side wall. Looped legs depending from each respective side member support the device rearwardly.

Other objects will be apparent from the following description when taken in conjunction with the accompanying three sheets of drawings, wherein:

Figure 4 is a fragmentary perspective view looking up at the forward end of the device; and Figure 5 is a fragmentary perspective view looking forwardly and up at the parts shown in Fig. 4 from the underside of the device.

Like characters of reference designate like parts in those figures of the drawings in which they occur.

In the drawings:

Figure 1:
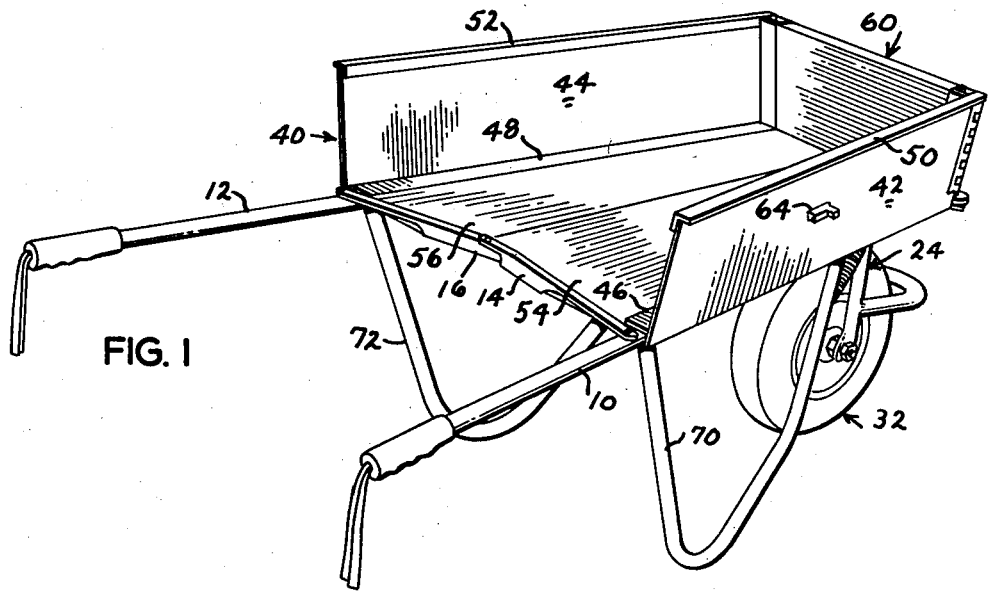
Figure 1 is a three-quarter rear perspective view of the device in operable position.
Figure 2:
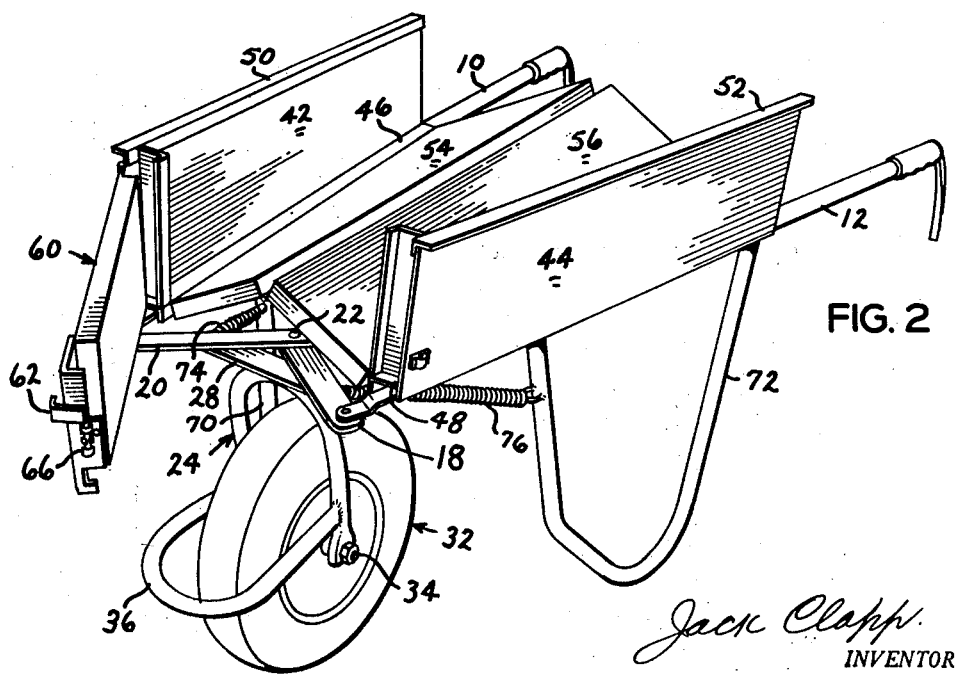
Figure 2 is a three-quarter front perspective view illustrating the device in a partly folded or collapsed position.
Figure 3:
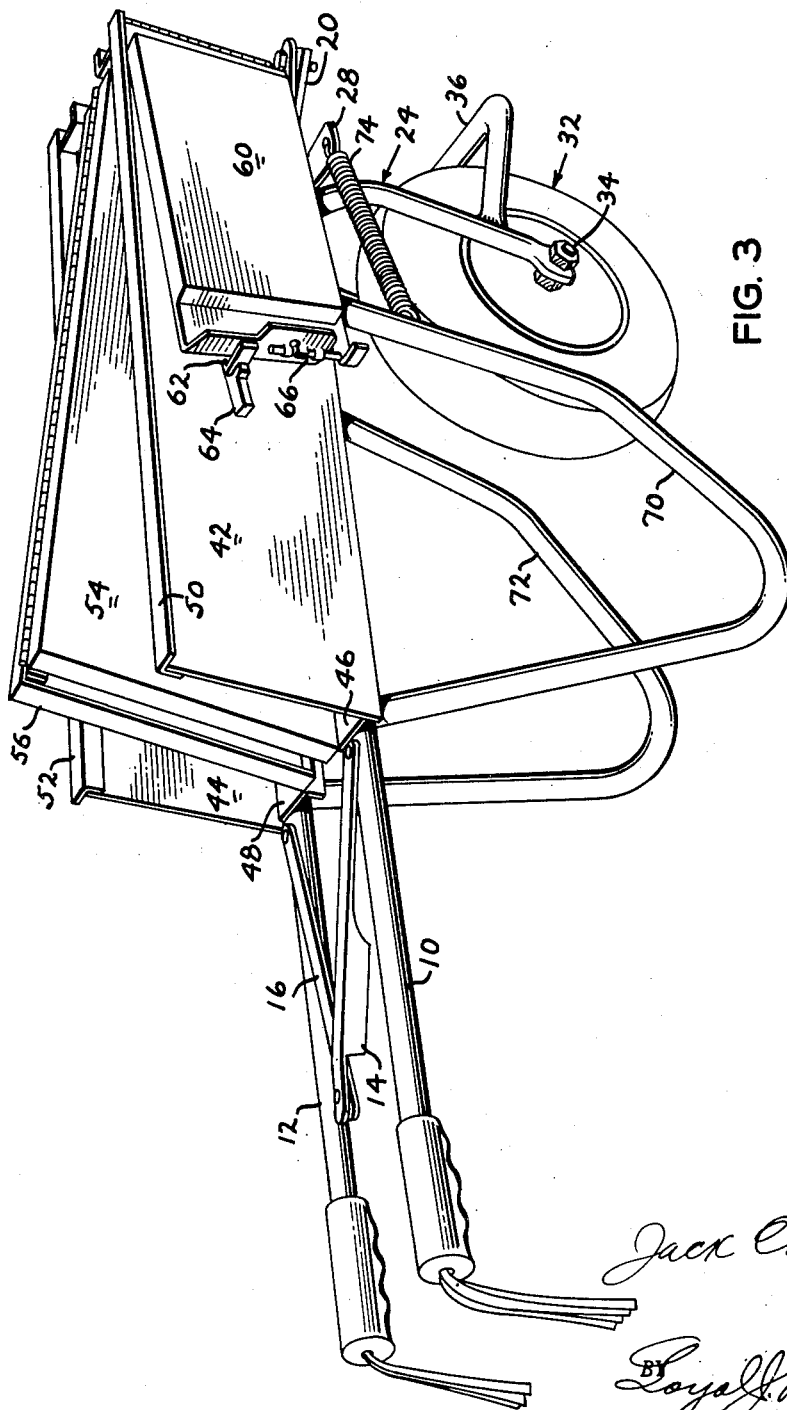
Figure 3 is a perspective view similar to Fig. 1, illustrating the device in completely collapsed position.

The reference numerals 10 and 12 indicate a pair of elongated rigid side members or handles held in spaced-apart relationship by a pair of hingedly connected angle iron cross members 14 and 16 pivotally connected at each end to each respective side member 10 and 12 intermediate their ends. Forwardly the side members 10 and 12 are joined in spaced forwardly converging relationship by a front cross member comprising a pair of strap-like bars 18 and 20 pivotally connected at each end to each foremost end of the side members 10 and 12, respectively. The bars 18 and 20 converge rearwardly and are hingedly connected by a bolt 22, in substantial horizontal pivoting relation. The flattened forward ends of each respective side member 10 and 12 are curved downwardly and forwardly to place the plane of the front cross members 18 and 20 slightly below the plane of the members 10 and 12, for the purposes which will presently be apparent.

A rod like inverted U-shaped yoke 24 is connected at its uppermost end to the underside of the overlapping pivotally connected bars 18 and 20 by the pivot pin or bolt 22 (Fig. 5). A transverse cross bar 28 is rigidly connected to the uppermost end of the yoke 24 forwardly of the bolt 22. The length of the cross bar 28 is such that its ends terminate at a point substantially medial of the length of each cross member 18 and 20. A lug 30 is rigidly connected to and depends from the lower surface of each bar 18 and 20 forwardly of and adjacent the respective ends of the cross bar 28. The purpose of the lugs 30 is to prevent pivoting movement of the cross bar 28 and the yoke 24. A wheel 32 is journaled between the depending ends of the yoke 24 on a transverse axle 34 in a conventional manner. A bumper or rod-like U-shaped guard 36 envelops the forward or leading edge of the wheel 32 in substantially a horizontal position having the ends of the U rigidly connected to the yoke 24 adjacent its depending ends.

A folding tray 40 is longitudinally carried by the side members 10 and 12 between the cross members. The tray 40 includes rectangular substantially vertically disposed side panels 42 and 44. Each side panel is rigidly connected longitudinally along one edge to the outer side of a channel member 46 and 48 rigidly connected to and enveloping the upper surface and sides of each side member 10 and 12. Rigidity is added to the sheet iron side panels 42 and 44 by angle iron strips 50 and 52 rigidly connected longitudinally to the uppermost edge of each respective panel. A planar bottom for the tray is formed of two sections 54 and 56 which are longitudinally hingedly connected adjacent each outwardly disposed edge to the respective adjacent side of each channel 46 and 48 for upward pivoting movement relative to the side panels. The central meeting edges of the bottom sections 54 and 56 are hingedly connected longitudinally along their lower surfaces for upward pivoting relation. When the bottom of the tray is flatly disposed the hinged connection of the cross member 14 and 16 lies forwardly of the center line between their ends disposing the cross members 14 and 16 in resilient contact with the rearmost edge of the bottom because these members are preferably slightly longer than the extended width of the bottom sections 54 and 56. This binding action prevents accidental collapsing or folding of the tray by rearward pivoting movement of the cross members 14 and 16. Forwardly the tray 40 is closed and held in bottom extended position by an end panel 60 of substantially the same vertical height as the side panels 42 and 44. The end panel 60 is hingedly connected at one end to the forward end of the panel 42 to pivotally swing forwardly and around and lie flatly adjacent the outer side of the panel 42. The free end of the end panel 60 is held in this folded position by a spring clip 62 resiliently engaged with a hook 64 on the panel 42. The free end of the end panel 60 is connected to the forward end of the side panel 44 by a sliding bolt 66 to close the tray. When it is desired to fold the tray 40, the bolt 66 must be removed or released from its co-operating slot.

Rod-like legs 70 and 72 depend from the side members 10 and 12, respectively, adjacent the intermediate cross members 14 and 16. The legs 70 and 72 are arcuately curved forwardly and upwardly to join the respective side member intermediate its ends. Helically coiled springs 74 and 76 are connected at each end, respectively, to the forward portion of each leg 70 and 72 and to the adjacent end of the cross bar 28. The purpose of the springs 74 and 76 is to maintain the wheel 32 in substantial alignment with the tray when the same is in folded position, as is more fully explained hereinbelow.

When in erected or operating position the device may be used in a conventional manner. The device is collapsed or folded by manually horizontally pivoting the cross members 14 and 16 rearwardly which releases tension from the bottom of the tray 40. The bolt 66 is disengaged and the end panel 60 folded flatly adjacent the panel 42, as disclosed hereinabove. The side members 10 and 12 may then be moved toward the longitudinal center of the device as the tray bottom sections 54 and 56 pivot upwardly simultaneously with the substantially horizontal rearward pivoting movement of the cross members 14—16 and 18—20. As the cross members 18 and 20 pivot rearwardly the lugs 30 are released from contact with the cross bar 28 allowing the wheel to pivot on the bolt 22. The springs 74 and 76 then act to maintain the wheel in substantial alignment with the folded tray. When folded the transverse width of the device is substantially no wider than the axle journaling the wheel and less than the length of most soft drink bottles.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A collapsible wheelbarrow, including: a pair of elongated side members; forward and rearward horizontally pivoting cross members joining said side members in spaced relationship so that the longitudinal axis thereof converge toward the forward end; an inverted U-shaped yoke pivotally depending from the central portion of said forward cross members; a wheel journaled on a horizontal transverse axle between the depending ends of said yoke; a transverse bar centrally rigidly connected to the upper end of said yoke; depending lugs carried by said forward cross member and bearing against said transverse bar to maintain said wheel in longitudinal alignment between said side members; a folding tray carried by said side members and extending between said cross members, said tray having rigid vertical side panels and a forward end panel hingedly connected at one end to the forward end of one said side panel and removably connected at its end opposite said hingedly connected end to the forward end of the other said side panel, said tray having a two piece planar bottom hingedly connected to each said side panel and centrally hinged longitudinally; a leg depending from each respective said side member; and a pair of resilient members having their respective ends connected to each end of said transverse bar and each said leg, respectively, for holding said wheel in longitudinal alignment with said tray when the same is in folded position.

2. A collapsible wheelbarrow, including: a pair of elongated side members; a forward cross member and a rearward cross member joining said side members in spaced relationship so that the longitudinal axes thereof converge toward the forward end, said cross members each hingedly connected medially their ends for horizontally pivoting rearwardly and positioning said side members in relatively close spaced substantially parallel relation; an inverted U-shaped yoke pivotally depending from the central hinged connection of said forward cross member; a wheel journaled between the depending ends of said yoke on a transverse axle; a transverse bar centrally connected rigidly to the upper end of said yoke; depending lugs carried by said forward cross member and bearing against the forward edge of said transverse bar to maintain said wheel in longitudinal alignment between said side members; an upwardly open folding tray carried by said side members and extending between said cross members, said tray having rigid vertical side panels and a forward end panel hingedly connected vertically at one end to the forward end of one said side panel and removably connected at its end opposite said hingedly connected end to the forward end of the other said side panel, said tray having a two piece planar bottom hingedly connected to each respective said side panel and centrally hinged longitudinally, said rearward cross member bearing against the rearmost edge of said bottom to maintain the tray in open position; a leg depending from each respective said side member; and a pair of resilient members having their respective ends connected to each end of said transverse bar and each said leg, respectively, for holding said wheel in longitudinal alignment with said tray when the same is in folded position.

3. A collapsible wheelbarrow, including: a pair of elongated side members; a front cross member and a rearward cross member joining said side members in spaced relationship so that the longitudinal axes thereof converge toward the forward end, said cross members each hingedly connected medially their ends for folding upon themselves and positioning said side members in relatively close spaced substantially parallel relation; an inverted U-shaped yoke pivotally depending from the central hinged connection of said front cross member; a wheel journaled between the depending ends of said yoke on a transverse axle; a transverse bar centrally connected rigidly to the upper end of said yoke; depending lugs carried by said front cross member and bearing against said transverse bar to maintain said wheel longitudinally between said side members; a tray mounted on said side members, said tray including a substantially vertical side panel carried by each respective side member and extending between said cross members, a planar bottom hingedly connected to each respective said side member and medially hinged longitudinally, and a planar front panel hingedly connected at one end to the forward end of one said side panel and removably connected at its end opposite said hingedly connected end to the forward end of the other said side panel; and unitary legs depending from said side members.

4. A collapsible wheelbarrow, including: a pair of elongated side members; a front cross member and a rearward cross member joining said side members in spaced relationship so that the longitudinal axes thereof converge toward the forward end, said cross members each pivotally connected adjacent each end, respectively, to said side members, and hingedly connected medially their ends for horizontal pivoting and positioning said side members in relatively close spaced parallel relation; an inverted U-shaped yoke pivotally depending from the central hinged connection of said front cross member; a wheel journaled between the depending ends of said yoke on a transverse axle; a transverse bar centrally connected rigidly to the upper end of said yoke, said transverse bar having a length less than the extended length of said front cross member; depending lugs carried by said front cross member and bearing against said transverse bar to maintain said wheel in longitudinal alignment between said side members; a folding tray mounted on said side members, said tray including a substantially vertically disposed side panel rigidly carried by each respective side member, a two panel bottom medially hinged longitudinally, each of said two panels having one side edge hingedly connected with each respective side member; a front panel hingedly connected at one end to the forward end of one said side panel and removably connected at its end opposite said hingedly connected end to the forward end of the other said side panel for closing the forward end of said tray; and a unitary looped leg depending from each said side member.

5. A collapsible wheelbarrow, including: a pair of elongated side members; horizontally pivoting cross members joining said side members in spaced relationship so that the longitudinal axes thereof converge toward the forward end, one of said cross members being disposed adjacent the forward end portion of said side members; an inverted U-shaped yoke pivotally depending from said cross member adjacent the forward end portions of said side members; a wheel journaled between the depending ends of said yoke on a transverse axle; a transverse bar centrally connected rigidly to the upper end of said yoke; depending lugs carried by said cross member adjacent the forward ends of said side members and bearing against said transverse bar adjacent each respective end thereof for maintaining said wheel longitudinally aligned between said side members; a folding tray mounted on said side members betwen said cross members, said tray including vertical side panels rigidly carried by said side members and a planar bottom hingedly connected to each respective side member and having a longitudinal medial hinge permitting upward pivoting movement of the central portion of said bottom, said tray having a forward end panel hingedly connected at one end to the forward end of one said side panel and removably connected at its end opposite said hingedly connected end to the forward end of the other said side panel; and legs depending from said side members.

References Cited in the file of this patent

UNITED STATES PATENTS 2,422,331     Bates ------------------ June 17, 1947

FOREIGN PATENTS 1,017,027     France ---------------- Nov. 28, 1952